Dec. 2, 1924.　　　　　　　　　　1,517,951
C. W. CADE
TRUCK
Filed June 2, 1920
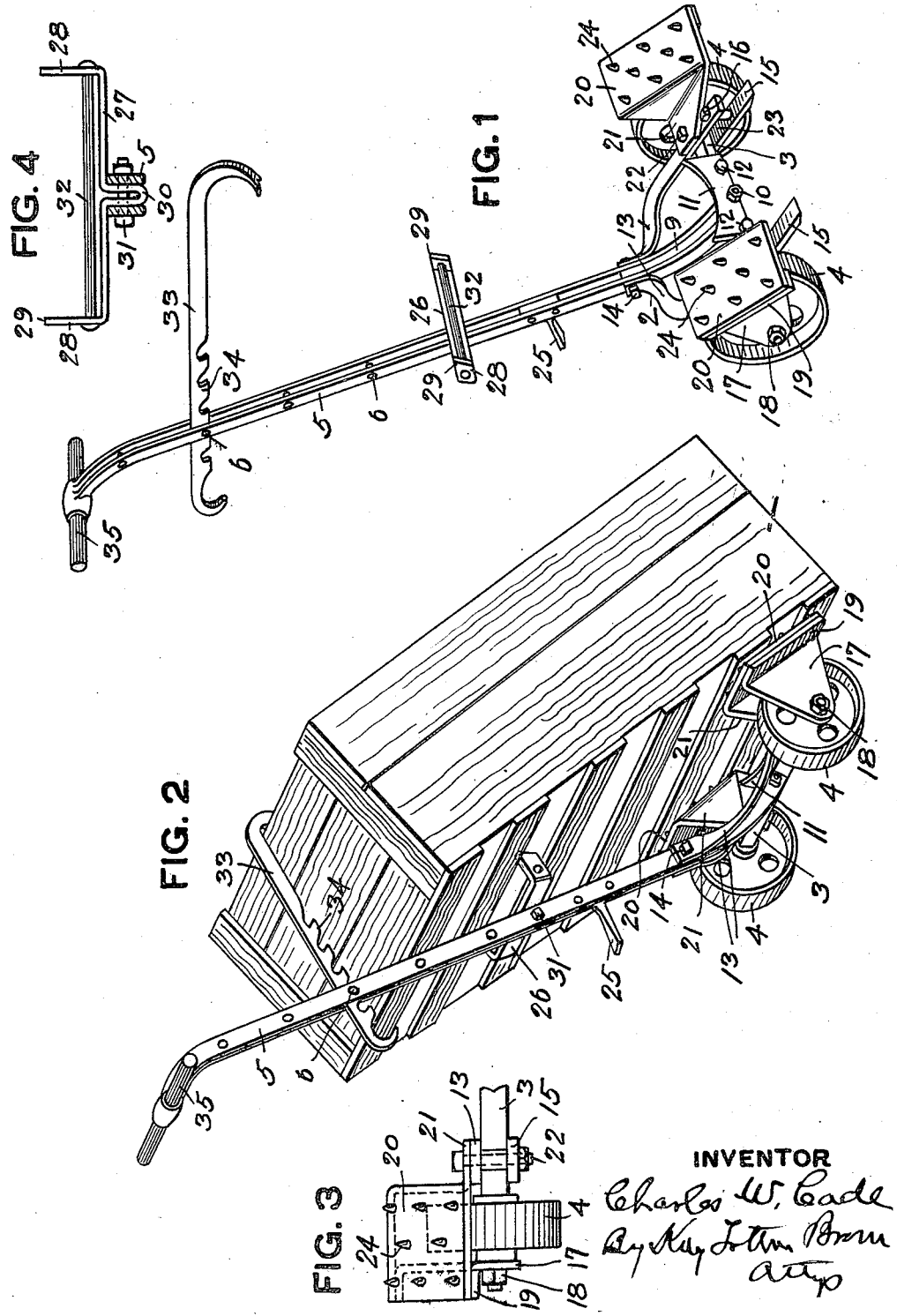
INVENTOR
Charles W. Cade Patented Dec. 2, 1924.

1,517,951

UNITED STATES PATENT OFFICE.

CHARLES W. CADE, OF BELLEVUE, PENNSYLVANIA, ASSIGNOR TO McKINNEY MANUFACTURING COMPANY, OF PITTSBURGH, PENNSYLVANIA, A CORPORATION OF PENNSYLVANIA.

TRUCK.

Application filed June 2, 1920. Serial No. 386,081.

*To all whom it may concern:*

Be it known that I, CHARLES W. CADE, a citizen of the United States, and resident of Bellevue, in the county of Allegheny and State of Pennsylvania, have invented a new and useful Improvement in Trucks; and I do hereby declare the following to be a full, clear, and exact description thereof.

My invention relates to what are generally termed "one-man trucks" for handling crates or boxes in ware-rooms, freight stations, etc.

The object of my invention is to provide a truck of this character by which one man can readily mount a box or crate on the truck and move the same without difficulty from one place to another, the box or crate when mounted on the truck being held securely in position thereon to prevent liability of its slipping therefrom in the course of transportation.

In the accompanying drawing, Fig. 1 is a perspective view of my improved truck; Fig. 2 is a like view showing the crate in position thereon for transportation; and Figs. 3 and 4 are details.

In the drawing, the numeral 2 designates the truck proper which consists of the axle 3 upon which the wheels 4 are loosely mounted.

The shaft 5 is made up of a pair of bars which are connected by pins 6 with riveted ends, said pins being arranged at suitable intervals apart, and said pins acting as spacers for the bars composing the shaft and also as supports for the grappling-hook provided with the teeth adapted to engage said pins.

Secured to the lower end of the shaft 5 is the center-brace 9 which extends through an opening in the axle, a nut 10 on the end of said brace securing same to said axle. A rest 11 is likewise secured in place by said nut 10 and by bolts 12 which hold said rest securely and rigidly in position.

Side-braces 13 are secured to the lower end of the shaft 5 by the same bolts 14 which secure the center-brace 9 in position. These side-braces project beyond the axle, and the toe-pieces 15 are secured to the ends of said side-braces by the bolts 16. Mounted on the outer ends of the axle are the fan-shaped members 17 which are secured to the axle by means of the nuts 18. These fan-shaped members 17 have the outwardly extending flanges 19 to which the gripping-plates 20 are riveted. These gripping-plates 20 have the flanges 21 which are secured by the bolts 22, said bolts also passing through the inwardly projecting straps 23 of the toe-pieces.

In this manner, the wheel guards are built up of the fan-shaped members 17 and the gripping-plates 20.

The gripping-plates 20 have the pointed studs 24, said studs being arranged in rows on the outer edges of the plate, and preferably with a row intermediate thereof and staggered with reference to the studs of the outer rows, all for the purpose more fully hereinafter set forth. These studs 24 may be secured in place by riveting or otherwise. It will be apparent that while I have shown well defined pointed studs on said plates that any sort of projections may be employed which will engage or grip the box.

Mounted on the shaft 5 is the foot-plate or step 25 of the ordinary type.

A cross-bar or package-rest 26 is secured to the shaft 5, said package-rest being made of a piece of metal 27 bent with the outwardly projecting portions 28 with beveled ends to form the sharp points 29. The metal is bent at its mid-portion to form the flange 30 which flange enters the space between the bars of the shaft 5, and a bolt 31 secures the package rest 27 securely and rigidly in position. A brace-bar 32 extends between the outwardly projecting portions 28 and serves to strengthen the said package-rest.

An ordinary grappling-hook 33 is provided with the teeth 34 adapted to engage the pins 6 of the shaft 5.

A handle 35 is provided at the outer end of the shaft 5.

In the handling of a box or crate with my improved truck, the operator moves the truck up to the box or crate and brings the shaft 5 up into a substantially vertical position, whereupon the grappling hook is thrown over the box drawn up tight, and in drawing it over toward him with his foot on the foot-plate, the toe-pieces are forced in under the box. In this manner the box is tipped back until the box rests upon the pointed studs 24 af the gripping-plates 20, and on the sharpened points 29 of the rest 26.

The box is then rigidly held in position on the truck for movement from one place to another, and with the greatest ease by one man.

The pointed studs 24 are arranged on the gripping-plate 20 so as to insure gripping slatted crates of various sizes. In some cases the uppermost and lowermost studs will be the only ones in engagement, and they will engage adjacent slats, the intermediate studs not doing any work. In other cases, however, where the slats are not so far apart, intermediate studs as well as the inner set of staggered studs may come into play, and altogether by having the studs staggered in this manner, a plurality of studs are always in engagement with the crate in sufficient numbers to securely prevent it from slipping from the truck during transportation.

What I claim is:

A truck comprising an axle, wheels mounted thereon, a package rest at each side of the truck having a flange portion extending across the top of the wheel and a vertical portion extending along one side of the wheel to a point adjacent to the axle, a second flanged member having a vertical portion secured to the axle at the opposite side of said wheel and having a horizontally disposed flange portion supporting said first-named flange adjacent to the outer edge thereof, a handle supporting member, and a common means for securing said first-named flanged portion and said handle member to the axle.

In testimony whereof I, the said CHARLES W. CADE, have hereunto set my hand.

CHARLES W. CADE.

Witnesses:
ROBT. D. TOTTEN,
JOHN F. WILL.